UNITED STATES PATENT OFFICE.

BOTHO SCHWERIN, OF FRANKFORT-ON-THE-MAIN, GERMANY, ASSIGNOR TO GESELLSCHAFT FÜR ELEKTRO-OSMOSE M. B. H., OF FRANKFORT-ON-THE-MAIN, GERMANY, A CORPORATION.

PROCESS FOR MAGNETIC SEPARATION OF ORES OUT OF SLIMES.

1,063,893. Specification of Letters Patent. Patented June 3, 1913.

No Drawing. Application filed March 12, 1913. Serial No. 753,857.

*To all whom it may concern:*

Be it known that I, BOTHO SCHWERIN, a subject of the German Emperor, and residing at Frankfort-on-the-Main, Germany, have invented certain new and useful Improvements in Processes for Magnetic Separation of Ores Out of Slimes, of which the following is a specification.

Although the magnetic separation of ores has been considerably improved in recent years, there still has been a limit beyond which even the most perfect of processes failed, so that large quantities of ores were lost. This limit was reached in magnetic separation when the problem arose as to the treatment of mineral slimes as it is to be found in a natural state or as produced by ore dressing. When treating so-called moldy ores for instance a slime subsides which consists of a mixture of loam or clay and peroxid of iron from which up to now it was not possible to obtain the iron by magnetic separation. If a magnetic action was observable at all, only strongly polluted iron went to the magnet. In most cases no influence was at all apparent.

Researches made by the inventor have shown that fine mineral slimes of the aforementioned kind may be treated in an economical fashion by being subjected to magnetic separation while in colloidal state. For one must know that the fine ore slimes consist of an intimate mixture of particles variously electrically charged, and as has been shown held so closely adsorbed to each other that they under ordinary circumstances give the impression of being but one substance. It is shown now that one can make such slimes susceptible of the magnetic treatment, *i. e.*, minerals may be obtained in a pure state magnetically provided they be treated in colloidal state. This state may be created for instance, by adding electrolyte of an acid nature to the slime of electropositive matter, *i. e.*, such matter that, under the influence of the electric current, would be attracted to the cathode; or, by adding electrolytes of a basic nature to the slime of such substances, *i. e.*, electronegative bodies which would move to the anode in the electric current. Through the adding of the suitable electrolytes the adsorbing connections of the finest particles will be broken up in so far as the one component devolves into sol-state, the other component into gel-state. The separation of the finest particles takes place in such a great proportion that one can make the slime so treated subject directly to the magnetic action, and obtain the non-magnetic particles apart from the magnetic and the latter according to the modern separation process in various fractions.

A suspension which contained only sizes of grain under 1/4 mm. was worked off according to the process on the separators described in the German Patents Nos. 228913 and 230037 and the result was: magnetic product with 49.56% iron and 15.64% residue; magnetic product with 37.00% iron and 29.04% residue. The yield of this trial reckoned on metallic iron was 61.36%.

One suspension coming from another mineral which contained only grain size under 1/15 mm, resulted in the working up as follows: magnetic product with 48.12% iron; magnetic product with 44.72% iron. The yield in this trial reckoned on metallic iron was 56.72%.

The process is naturally applicable not only to iron minerals but also to all bodies which remain magnetically active.

What I claim, is:

1. A process for magnetic separation of ores out of slimes consisting in bringing the slimes to be treated into colloidal state and subjecting them to magnetic separation.

2. A process for magnetic separation of ores out of slimes consisting in adding to the slimes an electrolyte of an electrical character which is the opposite of the character of the ore to be separated and subjecting the slimes to magnetic separation.

In testimony whereof I affix my signature in presence of two witnesses.

BOTHO SCHWERIN.

Witnesses:
 JEAN GRUND,
 CARL GRUND.